UNITED STATES PATENT OFFICE.

WILLIAM H. HARDING, OF PHILADELPHIA, PENNSYLVANIA.

ART OF MAKING HYDRAULIC CEMENTS, &c.

No. 908,094.           Specification of Letters Patent.           Patented Dec. 29, 1908.

Application filed April 30, 1908. Serial No. 430,164.

*To all whom it may concern:*

Be it known that I, WILLIAM H. HARDING, a citizen of the United States, and a resident of Philadelphia, in the county of Philadelphia and State of Pennsylvania, have invented certain new and useful Improvements in the Art of Making Hydraulic Cements, &c., of which the following is a specification.

My present invention relates more specifically to the production of Portland cement, though certain of its features and advantages may be utilized in connection with other processes involving the decomposition of minerals and the fritting or clinkering of the nonvolatile products of such decomposition.

The production of Portland cement necessarily involves the fritting or clinkering of an alkaline base, such as lime (CaO) with an acid of the class typified by silica ($SiO_2$) and alumina ($Al_2O_3$). Usually, the lime, silica, and alumina are all present in certain proportions, and the limits of variation in the percentage of each are now well recognized in the art. As the constituent materials are not found in nature in a free state, they are commonly prepared for the clinkering process by the burning of raw materials containing compounds thereof in suitable proportions and free from too great admixture of objectionable materials or elements which might interfere with the process or deteriorate the quality of the cement product.

If the natural materials available do not contain the constituents in proper proportion, a suitably proportioned mixture may be prepared either by using different materials, each containing one or more desired constituents, or by combining a material containing too great a proportion of one constituent with another material containing too great a proportion of another constituent.

The lime is commonly obtained from material containing calcium carbonate ($CaCO_3$), which is decomposed by heat into lime (CaO) and carbon dioxid gas ($CO_2$), and the silica and alumina are commonly obtained from materials in which they are found combined with water of crystallization, which is driven off by the heat.

Commonly the raw material is natural rock containing varying proportions of calcium carbonate and silica, commonly associated with alumina, magnesia, iron, etc. Usually, lime rock, chalk, or similar material, containing a greater lime content than is necessary for Portland cement is used in connection with so-called cement rock, clay, or other material containing an excess of silica, the proportions being such that the mixture when calcined and fritted or clinkered, will consist of a compound containing tri-calcium silicate and aluminate. According to the universal practice, these raw materials are finely ground and intimately mixed, either wet or dry, prior to heating them to drive off the carbon dioxid and water from the lime, silica, and alumina. The double process, first of decarbonizing the calcium carbonate and dehydrating the silica and alumina, and, second, fritting or clinkering the resulting lime, silica, and alumina so that they may unite in the proper relation to form what is commonly supposed to be a "solid solution" of calcium silicates, aluminates, etc., is now and always has been performed by a single heat, both when the burning is done in an upright kiln and when it is done in a rotary kiln.

It has long been recognized that the upright kiln is not well adapted for clinkering and that the rotary kiln is uneconomical, and it was proposed to completely dry and calcine the material in an upright kiln and then clinker it in a rotary kiln; but prior to my invention this method has been found to be practically impossible, and no one has ever succeeded in applying it commercially. Moreover, the proposition has been declared unsound, because the rotary kiln requires such great heat at the lower end for clinkering that any amount which can be absorbed in calcining further up the kiln is insignificant as compared with the total unavoidable waste. The result has been that the single burning operation with continuous calcining and clinkering in a rotary kiln has gradually become recognized and generally accepted as the standard modern method of making Portland cement, so that now practically all of the Portland cement made in this country is produced by this method; and the use of the upright kiln for Rosendale cement, has been due mainly to the demand for a cheaper, lower grade cement and to the pre-existence of the upright kiln plants and the expense involved in substituting rotary kilns.

My present invention consists of a method whereby the raw material instead of being calcined and clinkered at one heat, is subjected to two distinct burning operations in such manner and under such conditions as have proved highly practical and economical, as well as productive of a good quality of Portland cement clinker.

In the above mentioned cases where it has been proposed to use a double burning process, it was supposed that the clinkering operation in the rotary kiln would be improved if the dehydration and decarbonization of all of the materials could be made perfect before charging it into the rotary clinkering kiln, but according to my experience with my process, in which this is an easily obtainable condition, it is very desirable that there be some material, even though it be an extremely small percentage, which remains to be dehydrated or decarbonized or dried, and thereby to absorb heat at or near the region where the intensity of the applied heat begins to approach a temperature sufficient to clinker completely dehydrated and calcined material, to the end that the material shall not be too fully clinkered at a point too far up the kiln, as this would result in subjecting clinker to clinkering temperature for too long a time. In fact, the clinkering operation in the continuous feed rotary kiln is most easily accomplished where there remains some uncompleted dehydrating or calcining reaction which may be prolonged so that it will take place to some extent at least, at or near the time or place where the clinkering process commences, so that the two processes succeed each other or even overlap or intermingle in the sense that certain particles may be undergoing dehydration or decarbonization at points not too remote from other particles which are sintering or fritting to form the clinker. One reason for this may be that the clinkering operation, wherein the alkaline lime at high temperature unites with the acid silica and alumina is, theoretically at least, an exothermic or heat evolving operation and, in any event, is one which does not involve appreciable absorption of heat, whereas the operation of driving off free water or water of crystallization or of driving off the carbon dioxid from the calcium carbonate, although occuring at lower temperatures, are destructive processes which do involve great absorption of heat. It seems probable that a certain amount of heat absorbing operation is beneficial, insomuch as the heat absorption must tend to temper the heat evolving operation of clinkering, and if this had no other effect, it would tend to localize the clinkering zone nearer the discharge end of the kiln, and thus to shorten the time between beginning of clinkering and discharge of the material from the kiln. This may be of considerable importance, insomuch as clinkering is a critical operation so far as concerns time and temperature. When performed in a rotary kiln, it requires that the material be raised to a temperature commonly supposed to be between 2500 and 3000 degrees Fahrenheit, in order that the union of the materials may be sufficiently complete and yet the temperature must not be too high or too long continued, or the material will be what is technically known as overburned.

In another application of even date herewith, I have described the advantages inherent in having some carbon dioxid evolved in the clinkering kiln, particularly where all of the materials have been previously burned and, therefore, substantially completely dried. In said application, I have made broad claims to the method of making Portland cement clinker from material previously subjected to heat, which consists in feeding said material into a rotary kiln; generating in said kiln a temperature sufficient to effect the clinkering of the materials; and predetermining or adjusting the rate of feed, the heaviness of the feed, and the rapidity of rotation of the kiln with respect to the heat within the kiln and with respect to the work which must be done on the material to bring it to the clinkering temperature, for the purpose and with the result of controlling the time and tempering the extent of the clinker reaction. In said application I have also made other claims in which the specific work which must be done on the material in the rotary kiln to bring it to the clinkering temperature consists in part of the chemical work of decarbonizing the calcium carbonate. This present application is related to said companion application and to the claims thereof insomuch as the process of this application has reference to the amount of heat absorbing work to be performed in the rotary kiln upon material already partly or wholly calcined. My present process may include the use of other materials, and work preferably includes driving off of an appreciable amount of water, either free water or water of crystallization, the latter operation being capable of employment as supplemental to or as a substitute for the calcium carbonate reaction claimed in the companion application. Hence, certain of the claims hereof involve utilization of the heat absorbing operation of driving off water which may be conjoined with various other factors, for the purpose and with the result of controlling the time and tempering the extent of the clinkering reaction. Certain of the claims of this application are limited to such process when applied to completely calcined materials while others are not limited.

With the above explanation, it will be understood that the method of this application preferably involves the presence of water in some form in the cement forming materials conveyed to the rotary kiln. Insomuch as the heat required to drive off water is lower than is necessary to drive off carbon dioxid from calcium carbonate, it will be understood that materials which have been subjected to sufficient heat to decarbonize the major portion of the calcium carbonate, contain very little water. Hence, I prefer to prepare the cement forming material having the desired percentage of water by adding the water after the decarbonization has been partially or wholly completed. The most practical way of doing this is to calcine material containing an excess of calcium carbonate, such as lime stone, chalk, or shells, and then to raise the percentage of silica, alumina, etc., required for Portland cement by adding clay. This may be dried and pulverized so that practically only the combined water or water of crystallization remains to furnish the tempering, heat absorbing action in the rotary kiln, or, if desired, the clay may be used wet, in which case the total amount of water will be increased by reason of the free water in addition to the combined water of crystallization. Any other suitable material containing an excess of silica and alumina may be used in the raw state. If raw cement rock, low in calcium carbonate, be used instead of clay, the tempering, heat absorbing reaction of decarbonizing the calcium carbonate content will be added to the heat absorbing effect of such water as the rock may contain. The use of this latter material will be found rather uneconomical, because of the extra expense involved in grinding the hard rock. In certain cases the material may be prepared by calcining cement rock to a desired degree and then bringing up the percentage of lime by the addition of raw lime rock, chalk, or shells. In the case of chalk the expense for grinding would not be so great. For any given percentage of water, either with completely calcined material or with partly calcined material, the distribution or region of activity of heat absorbing action may be further controlled by adjusting the heaviness of the feed and the rate of feed. In general, it may be said that in all cases the clinkering by my method will be more rapid than by the old method with unburned rock.
In the preferred practice of my method, wherein I use previously calcined lime in connection with clay, the work which the heat must perform may be made as great as desired and may be approximately as great as where uncalcined calcium carbonate is employed. This work need not be greater than that which is performed in the last twenty or thirty feet of a rotary kiln operating by the old process on raw uncalcined material, so that for the practice of my method, the length of the kiln need be only that necessary to drive off the required amount of water and to do the required amount of chemical work, if any, plus the further length necessary for heating up the materials to the drying and dehydrating temperature. Hence, an old fashioned short kiln is amply adequate for my purposes, although a kiln eighty to one hundred feet or more in length may be employed, and is even desirable in case the material employed for my purposes requires a large amount of heat absorbing work, as where it consists of the wet mixture or slurry employed for a wet process, or where it contains an exceptionally large percentage of unburned or partially burned material.

Another feature of my invention consists in regulating the supply of the material to the upper end of the kiln and the rate of feed therethrough, so that the feed shall be heavy; that is to say, so that the amount of material lying on the upturning side of the kiln shall be equal to or greater than the amount of such material commonly found in the ordinary rotary kiln process, where uncalcined rock is used.

Another feature of my invention consists in burning the coal at the ordinary rate employed for raw uncalcined rock, or even at a considerably higher rate, and then utilizing the resulting heat by increasing the heaviness and the rate of feed to a point where the increased amount of material operated upon, compensates for the decreased work which a given volume requires. In this way the full jet will supply no more heat than is necessary for the amount of material operated upon. This requires that the rate of travel of the material down the kiln be proportioned to the heaviness of the feed, so that the output of clinker will be at least two and preferably three, or even four times as great as in the case of raw, uncalcined rock, though in each specific case the precise ratio will depend somewhat upon the percentage of water or of unburned rock in my mixture, the latter depending, of course, upon how thoroughly and completely I burn the material in the upright kiln.

There is another feature of my invention which probably tends to account for my success. In the earlier days when the advantages of complete calcination in one burning and separate clinkering by another burning was first proposed, the jets used in the rotary kilns were either atomized oil jets or producer gas jets. The latter has always proved difficult of use for clinkering operations, because of the low heat intensity of the flame. On the other hand, the oil jets as used in rotary kilns have always been proportioned and designed to produce a very intense heat which would necessarily overburn the clinker unless restrained in some way, as by a dominant heat absorbing reaction continuing far down the kiln. I believe that this is one of the reasons why no one has ever succeeded in using this intensely hot flame for clinkering, except in connection with previously uncalcined, raw materials, which could be manipulated so as to distribute the heat absorbing decarbonization of the lime, to any extent.

One of the meritorious features of my invention consists in the discovery that one of the varieties of fuel and one of the forms of jet burner now in common use is suitable for the practical performance of the clinkering part of my process. The fuel which I use is very finely pulverized and carefully dried gas coal carrying approximately 30% to 38% volatile material. This fuel is used in connection with a low pressure diffuse burner of the McAuley type, supplied with air by a rotary fan. I prefer this to the high velocity jet of the Hurry and Seaman's type, which is supplied from an air compressor, because with the low pressure type the flame is more localized at the lower end of the kiln. Moreover, the fuel itself has a comparatively narrow range of temperature, which extends entirely through the range of temperature necessary for clinkering, and yet does not extend far above that range. Thus it is easier to limit and temper the clinkering of my precalcined material to prevent serious overburning. It will be noted that the specific fuel and burner used and the method of its use contribute to localize the region of clinkering temperature close to the lower end of the kiln, thus operating in a manner tending to produce a general effect contributory to the above described effect of the water or carbon dioxid in the material in the upper portion of the kiln.

It will be seen that the percentages of water and $CO_2$, the nature of the fuel, the character and location of the jet, the heaviness of the feed, and the rate of the feed, are all factors which are governed and controlled with the view to preventing such excessive overburning of the clinker as would make my process impractical. Hence, the degree and extent to which the one expedient must be utilized will depend upon the extent and effectiveness with which the others are utilized, and considerable variation and substitution of one for the other to produce the same result will be possible and desirable under varying circumstances and conditions. It will be obvious that the present full disclosure of the various possible subsidiary or contributing factors will enable those skilled in the art to successfully utilize one or more of these factors to the exclusion of the others. In attempting any such variations, considerable caution should be exercised, particularly in the matter of completely calcining all of the material and driving off all of the water, before subjecting it to the final heat in the rotary kiln, because the absence of heat absorbing work wonderfully facilitates the operation in the rotary kiln, and at the same time the heat is necessarily very intense. Hence, unless great care is exercised in properly tempering and controlling the action of the heat, as by insuring the presence of water or some other adequate heat absorbing work in the rotary kiln, the clinker may be overburned. In fact, the great facility with which completely decarbonized material becomes overburned in the rotary kiln, is one of the causes which has heretofore made the double burning operation practically impossible of successful performance, and it is with a view to controlling and tempering or localizing the clinkering, instead of with a view to facilitating it, that I have devised my present process wherein I make adequate use of the herein described tempering factors.

I will now describe an illustrative application of my process as practiced with certain specific raw materials: Chalk, shells, lime rock, or other suitable material containing a desired percentage of calcium carbonate may be more or less completely calcined in any kiln suitable for the purpose. Preferably, this material will be lime rock and the calcining will follow any of the known or desired methods of making lime, except that it is unnecessary for the calcination to be complete, and it is more economical in fuel and otherwise desirable that it be more or less incomplete. For my purpose, I find it cheaper to charge and draw the kiln more heavily or more frequently, so that the amount of fuel burned for a given amount of rock will be approximately one-half to three-fourths that used where complete calcination is necessary, as in the manufacture of lime. This product may be ground with very small expense for power and the grinding may be as fine as desired. The cement forming material of the desired composition is made by mixing with the calcined material a desired percentage of finely ground clay or shale, which preferably contains the water of hydration or combined water. The finely powdered mixture is fed into a rotary cement kiln, which may be 60 feet long and about 7 feet in external diameter, having preferably a small incline or pitch, say, $\frac{1}{4}$ to $\frac{1}{2}$ inch to the foot, and rotating at a relatively high speed of one revolution in 30 to 45 seconds. The feeding of the material at the upper end is preferably such as to maintain a heavy layer of the material on the upturning side of the kiln. The purpose of this is to expose only a small proportion of the material at a time, the main body of the material being shielded by the outermost layers. The purpose of the rapid rotation is to rapidly shift the material, so that each portion will receive a brief exposure to the heat on the surface and will then be tumbled over and covered up, the net result being a rapid succession of brief exposures.

As the material travels down the kiln, it is heated up to a temperature sufficient to drive off the water, and the continued application of the heat and the thorough agitation results in completing the calcining of any uncalcined constituent. The low pressure burner giving the diffuse flame, is preferably projected into impingement with the material on the upturning side of the kiln. The burner is preferably of such capacity and so supplied with pulverized coal that the coal consumption per hour is equal to or greater than the coal consumption required for that kiln when operating on raw uncalcined material. The rate of the feed of the material to the kiln is preferably such that the clinker output is three to five times that of the same kiln when operated in the ordinary way on raw uncalcined material. By properly proportioning the length of the kiln and the heaviness and rate of the feed to the amount of the fuel burned, the work to be done upon the material by the heat may always be made to bear such relation to the time of exposure and to the distribution and intensity of the heat that the material will not reach the clinkering temperature until it has approached within a predetermined desired distance from the discharge outlet of the kiln, and thus the time of exposure to the clinkering temperature and the duration and intensity of the clinkering reaction, may be accurately predetermined so as to secure the best results.

As I have above indicated, the work to be done includes the heating up of the material followed by the heat absorbing operation of driving off the water and any remaining carbon dioxid from such portion of the rock as has not been previously calcined. Though the dehydration involves great heat absorption and in certain cases is one of the most readily applicable expedients for tempering the process and preventing premature clinkering, it is not essential in all cases and it will be evident from the spirit of my disclosure, that if the feed is made sufficiently heavy and the agitation sufficiently rapid, and if these are properly proportioned to the rate of feed, the length of the path of the feed, and the intensity of the heat, so that under the conditions all of the heat which can be absorbed by the material while traveling the required distance will be only sufficient to do the work of heating up the material to the clinkering temperature by the time it arrives within a suitable distance from the discharge end or outlet—in such case, the duration of the clinkering reactions may be predetermined and controlled even though the work done by the heat consists mainly in raising temperature of the materials.

Where decomposition of calcium carbonate is included with dehydration as a part of the preliminary work done by the heat in the rotary kiln, the reactions within the kiln at the lower end and the various attendant visible phenomena are more nearly analogous to those to which the ordinary cement burner has become accustomed in his prior experiences with rotary kilns, and hence he can more easily learn to gage the situation and to properly vary the conditions in the practice of my new process. Another advantage is that the driving off of the last remnants of the $CO_2$ from the calcium carbonate requires a disproportionate amount of fuel when accomplished in the upright kiln, whereas the conditions in the rotary kiln are the best possible for thoroughly and cheaply completing this work and the attendant heat absorption is there an advantage for the various reasons explained. Other kinds of preliminary work requiring absorption of heat may be used in combination with or as a substitute for the operation of driving off water. Among the kinds of work suitable for this purpose, other than those mentioned above, are the driving off of potash, soda, or sulfur compounds. Reactions of the latter type are especially effective insomuch as most of them occur at or near the clinkering point and involve chemical absorption of relatively large amounts of heat per unit weight of the material driven off. Hence, though the quantities may be very small, the tempering effect may be very noticeable.

In certain cases lime rock, cement rock, or similar raw materials may be completely calcined and dehydrated, and then ground and mixed in the proper proportion required for the Portland cement clinker. This material may then be modified, or as it were, loaded by the addition of a certain amount of previously prepared mixture of material calculated to furnish the required amount of heat absorbing work in driving off water and carbon dioxid in the rotary kiln. This furnishes a convenient method of standardizing the operation of the plant, since a standard mixture may be prepared which, when added to the completely calcined mixture, will always give a standard, definite mixture to be acted upon by the heat in the rotary kiln. While this method of preparing the material is convenient and certain, it necessarily involves the expense of complete calcination of practically all of the material in the upright kiln. Hence, in actual practice, I prefer to underburn with such uniformity of conditions as are practically obtainable in the upright kiln, so as to get an approximately definite average percentage of underburned material in the product, and then to correct unavoidable variation by adding a variable amount of unburned raw mixture.

In cases where it is found desirable to standardize the amount of heat absorbing work to be done in the rotary kiln, the raw mixture may be proportioned so as to contain the precise proportion of lime, silica, and alumina content required for the Portland cement, so that variable amounts of such raw mixture may be added without varying the composition of the resulting clinker.

It will be understood that where standardization of the unburned content of the mixture is not attempted or is imperfect, the rate and heaviness of feed and the adjustment of flame and the amount of coal burned, may be varied so as to compensate for a considerable range of variation in the mixture.

Certain features of the clinkering process as herein described and as set forth in certain of the claims depend mainly on the composition of the cement forming material, and so far as concerns such claims it is relatively unimportant what kind of kiln or other apparatus is used for partially or wholly calcining the calcium carbonate content or for partially or wholly dehydrating the hydrated content of the material to be clinkered. Moreover, so far as concerns the broader subject matter, all the steps of my process are independent of the specific form of the apparatus in which the operation is performed; hence, except as therein otherwise definitely specified, the claims for the process are not limited to the specific apparatus described in the specification. In certain of the claims wherein there is more or less definite specification of apparatus, it will be understood that the apparatus is referred to for the purpose of more easily defining the nature of the operation constituting the process, rather than with a view to including any specific apparatus as a feature of my invention.

In certain of the claims I have referred to predetermining or adjusting certain factors of the operation of the clinkering kiln, as, for instance, the rate of supply of material and the rapidity of rotation of the kiln, with respect to the pitch, diameter, and length of the kiln and to the distribution and intensity of the heat within the kiln and with respect to the work which must be done upon the material to bring it to the clinkering temperature. In these cases the language is such as might be taken to imply that those factors which are predetermined or adjusted are the only variable factors and that the factors with respect to which they are adjusted are fixed. This classification of the factors is convenient and natural insomuch as it assumes a properly proportioned plant already installed and ready for operation. Nevertheless, where it is desired that the practice of the process include the construction of a new plant or the alteration of an existing plant, the factors of "pitch, diameter, and length of the kiln" and the "distribution and intensity of the heat within the kiln" are equally convenient and desirable factors for variation or adjustment with reference to the others. "The work which must be done on the material to bring it to the clinkering temperature" is, of course, in all cases capable of variation by variation in the character of the constituents of the material. Hence, it will be understood that where certain of these factors are specified in the claims as variable or adjustable with respect to certain other factors, such claims are to be considered as covering a process wherein any one or all of said factors are varied, adjusted, or predetermined for the described purposes, with reference to any one or all of the other factors.

I claim:

1. In the art of making Portland cement clinker, the process which consists in calcining lime rock to make lime, grinding the lime, and mixing it with clay in suitable proportions to constitute a cement forming material having suitable proportions of lime, silica, and alumina, said clay being dried and pulverized, but not freed from the associated water of hydration; and reheating and clinkering said material in a rotary kiln, substantially as described.

2. In the art of making Portland cement clinker, the process which consists in burning lime rock to partially calcine the same, grinding the burned product, mixing it with a material containing silica and alumina in suitable proportions to constitute a cement forming material having the proper proportions of lime, silica, and alumina; and reheating and clinkering said material in a rotary kiln heated by a jet of pulverized gas coal, substantially as described.

3. In the art of making Portland cement clinker, the process which consists in partially calcining material comprising calcium carbonate, grinding the partially calcined product, and mixing it with clay in suitable proportions to constitute a cement forming material having suitable proportions of lime, silica, and alumina, said clay being dried and pulverized, but not freed from the associated water of hydration; and reheating and clinkering said material in a rotary kiln, substantially as described.

4. In the art of making Portland cement clinker, the process which consists in preparing a partially calcined mixture of calcium carbonate, lime, and clay, the lime, silica, and alumina contents of the mixture being in proportions suitable for cement forming material; feeding said material into a rotary kiln; generating in the lower end of said kiln a temperature sufficient to effect the clinkering of the material at said lower end; and predetermining or adjusting the rate of feed, the heaviness of the feed, and the rapidity of rotation of the kiln with respect to the length of the kiln and to the distribution and quantity of the heat within the kiln and with respect to the work which must be done on the material to bring it to the clinkering temperature, for the purpose and with the result of controlling the time and tempering the extent of the clinkering reaction, substantially as described.

Signed at New York city, in the county of New York and State of New York this twenty-eighth day of April, A. D. 1908.

WILLIAM H. HARDING.

Witnesses:
   IRVING M. OBRIEGHT,
   ANITA BURKE.